United States Patent
Decaux

(10) Patent No.: US 7,323,037 B2
(45) Date of Patent: Jan. 29, 2008

(54) FILTERING DEVICE WITH ENHANCED BLEEDING ASSEMBLY AND DIESEL FUEL SUPPLY LINE COMPRISING SAME

(75) Inventor: Daniel Decaux, Blois (FR)

(73) Assignee: Delphi Technologies, Inc., Troy, MI (US)

( * ) Notice: Subject to any disclaimer, the term of this patent is extended or adjusted under 35 U.S.C. 154(b) by 393 days.

(21) Appl. No.: 10/490,139

(22) PCT Filed: Sep. 12, 2002

(86) PCT No.: PCT/FR02/03115

§ 371 (c)(1),
(2), (4) Date: Aug. 23, 2004

(87) PCT Pub. No.: WO03/035217

PCT Pub. Date: May 1, 2003

(65) Prior Publication Data

US 2005/0005584 A1    Jan. 13, 2005

(30) Foreign Application Priority Data

Sep. 19, 2001   (FR) .................................. 01 12109

(51) Int. Cl.
*B01D 19/00* (2006.01)

(52) U.S. Cl. .................. 95/253; 96/186; 55/428.1; 55/432; 55/433

(58) Field of Classification Search .................. 95/155, 95/219, 253; 55/423, 428.1, 432, 433; 96/155, 96/184, 185, 186

See application file for complete search history.

(56) References Cited

U.S. PATENT DOCUMENTS

| | | | |
|---|---|---|---|
| 3,574,085 A * | 4/1971 | Woelflin | 204/662 |
| 4,491,120 A | 1/1985 | Hodgkins | |
| 5,698,098 A | 12/1997 | Ernst et al. | |
| 5,855,772 A | 1/1999 | Miller et al. | |

FOREIGN PATENT DOCUMENTS

| | | |
|---|---|---|
| FR | 2698411 | 5/1994 |
| GB | 157669 | 1/1921 |

* cited by examiner

*Primary Examiner*—Robert A. Hopkins
(74) *Attorney, Agent, or Firm*—David P. Wood

(57) ABSTRACT

The device (6) includes a sealed casing (10) provided, in its lower part, with a bowl (22) for collection of a residual liquid, and an assembly (30) for purging the residual liquid which comprises means for evacuation of the liquid collected in the bowl and means for connecting the casing to the open air. The means for evacuation of the liquid include an orifice (36) formed in the wall of the casing substantially at the level of the bottom of the bowl (22). The means for connection to the open air include an orifice (34) formed in the wall of the casing (10) substantially opposite the orifice (36) for evacuation of the liquid. A single obturator (40) is displaceable between a sealing position in which, on the one hand, its upper part forms a tight plug (42) for the orifice for entry of air (34) and, on the other, its lower part forms a tight plug (48) for the orifice for evacuation of the liquid (36), and a position for purging the liquid in which, on the one hand, its upper part is disengaged from the orifice for entry of air to allow connection of the casing to the open air and, on the other, its lower part is disengaged from the orifice for evacuation of the liquid to allow gravity purging of the casing.

26 Claims, 5 Drawing Sheets

FILTERING DEVICE WITH ENHANCED BLEEDING ASSEMBLY AND DIESEL FUEL SUPPLY LINE COMPRISING SAME

The present invention relates to a filtration device with an improved purge assembly, of the type defined in the preamble of claim 1.

It is preferably applied to the field of filtration of gas-oil, in particular for low pressure gas-oil supply lines of diesel engines, for example of vehicles or machines.

Such devices are intended to separate from a liquid or gaseous mixture a liquid impurity which progressively accumulates in a collection bowl.

In the case of gas-oil, these devices permit separation from the gas-oil of the water which the gas-oil contains in emulsion. This water is separated from the gas-oil by suitable filtration means, such as a mesh and/or a paper filter, and accumulates by gravity in a lower collection bowl.

For proper operation of the device, it is periodically necessary to purge the residual liquid. For this purpose, a liquid evacuation orifice is formed in the wall of the collection bowl and generally provided with a plug screwed on in sealed manner; similarly, an obturatable orifice for connection to the open air is provided in the wall of the casing, generally in its upper part. The purge can only be performed when both orifices are open, for, as is well known, the liquid removed from inside a sealed container under the influence of gravity has to be replaced by a fluid, for example the outside air.

In certain devices, the orifice for connection to the open air is suitable to be closed by a plug screwed on in sealed manner, the gravity purge then being caused by unscrewing the two plugs.

For other devices, such as that described in GB 157 669, the orifice for connection to the air is formed by an orifice used for taking off the filtered gas-oil downstream of the casing, this orifice, outwith purge periods, being connected in sealed manner to for example an outlet pipe for the filtered gas-oil. In addition, the device described in GB 157 669 includes a valve for closing an orifice for supply of gas-oil to be filtered, which can be operated by means of the screwed plug for closure of the orifice for evacuation of the residual liquid, so that opening of one of the orifices for evacuation and supply simultaneously causes closure of the other of these orifices, and vice versa.

In all cases, these devices therefore have the disadvantage of a double manipulation to perform the purge. For a device for filtration of gas-oil integrated in the gas-oil feed line of a diesel engine, this disadvantage is the more marked as the size of the zone in which this line is installed often makes access to the filter casing difficult.

Moreover, to ensure good tightness of the casing outwith the purge operation, it is necessary to provide each closure organ manipulated with sealing packing resistant to repeated stresses. For example, each screwed plug must be provided with a flat washer, which always runs the risk of being forgotten, improperly positioned, or prematurely worn due to its exposure to the external environment.

The aim of the present invention is to propose a device of the above-mentioned type which permits an easy and quick purge operation and which minimises the risks of subsequent malfunctioning of the filtration device.

To this end, the invention has as its object a device of the above-mentioned type which has the characteristics of the characterising part of claim 1.

Other characteristics of this device, taken in isolation or in all technically possible combinations, are stated in dependent claims 2 to 26.

The invention also has as its object a gas-oil supply line, in particular for a diesel engine, having the characteristics of claim 27.

The invention will be better understood on reading the following description, given solely by way of example and with reference to the attached drawings in which.

Figure 1:
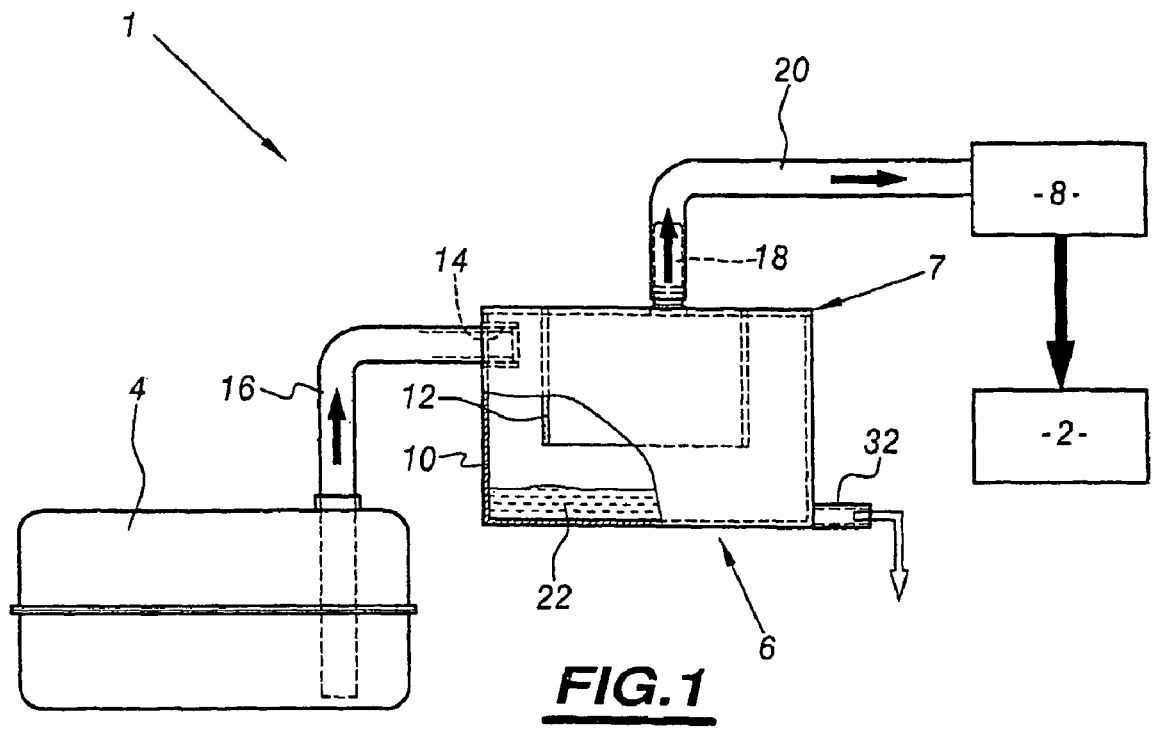
FIG. 1 is a diagrammatic view of a gas-oil supply line in accordance with the invention.

FIG. 1 shows a gas-oil supply line 1 of a diesel engine 2. The line 1 is a low pressure line, i.e. the gas-oil is displaced in this line, as indicated by the arrows, due to a depression at is downstream end relative to its upstream end. The line 1 includes, from upstream to downstream, a gas-oil tank 4, a device 6 for filtration of the gas-oil, and a gas-oil pump 8.

With the exception of the device 6, which will be described in detail hereinafter, the tank 4 and the pump 10 are elements known in themselves and will not be firstly described in detail.

Figure 2:
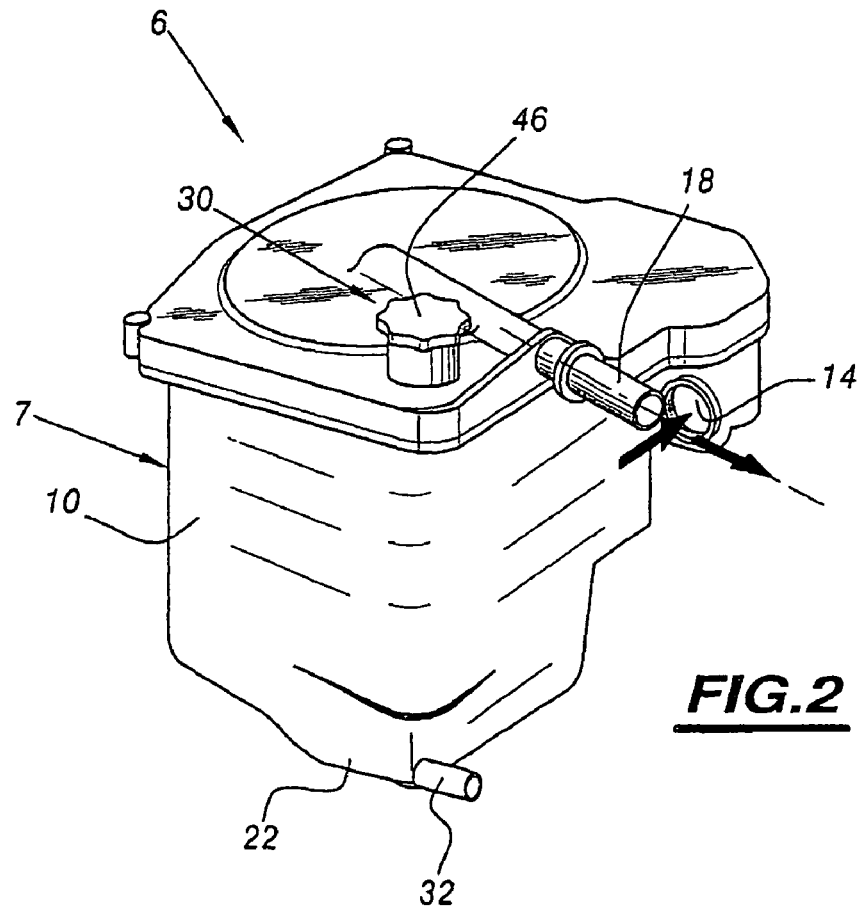
FIG. 2 is a perspective view of a gas-oil filtration device in accordance with the invention.

The device 6 includes, for the embodiment shown in FIGS. 1 to 4, a unit 7 for filtration of the gas-oil in order to remove water in emulsion from it. As shown in FIGS. 1 and 2, the filtration unit 7 includes a casing 10, for example made of plastics material and of substantially parallelepipedal general shape. Internally, the casing 10 defines a filtration chamber in which in known manner are arranged filtration means 12 suitable to retain the water in emulsion in the gas-oil. These filtration means, diagrammatically outlined in FIG. 1, are for example formed of a mesh of determined pore size and/or of filter paper which retain and evacuate to their lower part the water with which the gas-oil passing through them is charged. To this end, the casing 10 of the unit 7 includes, on the one hand, an orifice 14 for intake of the gas-oil charged with water, connected to the tank 4, via a connection 16, and, on the other, a pipe 18 for outlet of the gas-oil substantially free from water, connected to the pump 8, via a connection 20.

The unit 7 also includes a bowl 22 for collection of the water separated from the gas-oil by the means 12. This bowl is arranged in the lower part of the casing 10 and has a large water storage capacity which must be periodically purged.

To this end, the device 6 includes a purge assembly 30 able to allow the water contained in the bowl 22 to freely follow an outflow pipe 32, rigidly attached to the bottom part of the casing 10.

Figure 3:
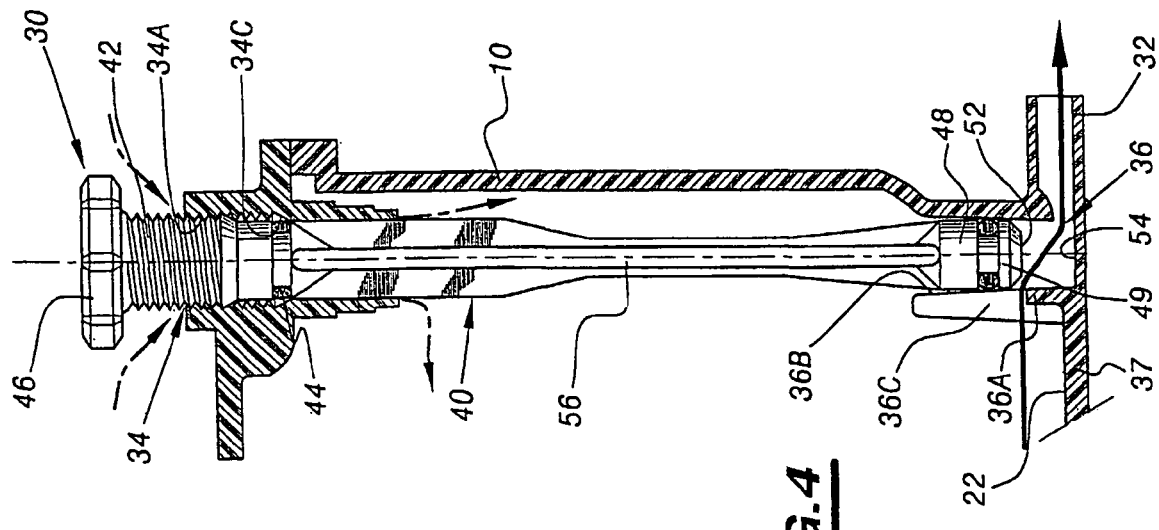
FIGS. 3 and 4 are partial views in longitudinal section of the purge assembly of the device of FIG. 2, this assembly being in the sealed position in FIG. 3 and in the purge position in FIG. 4.
Figure 4:
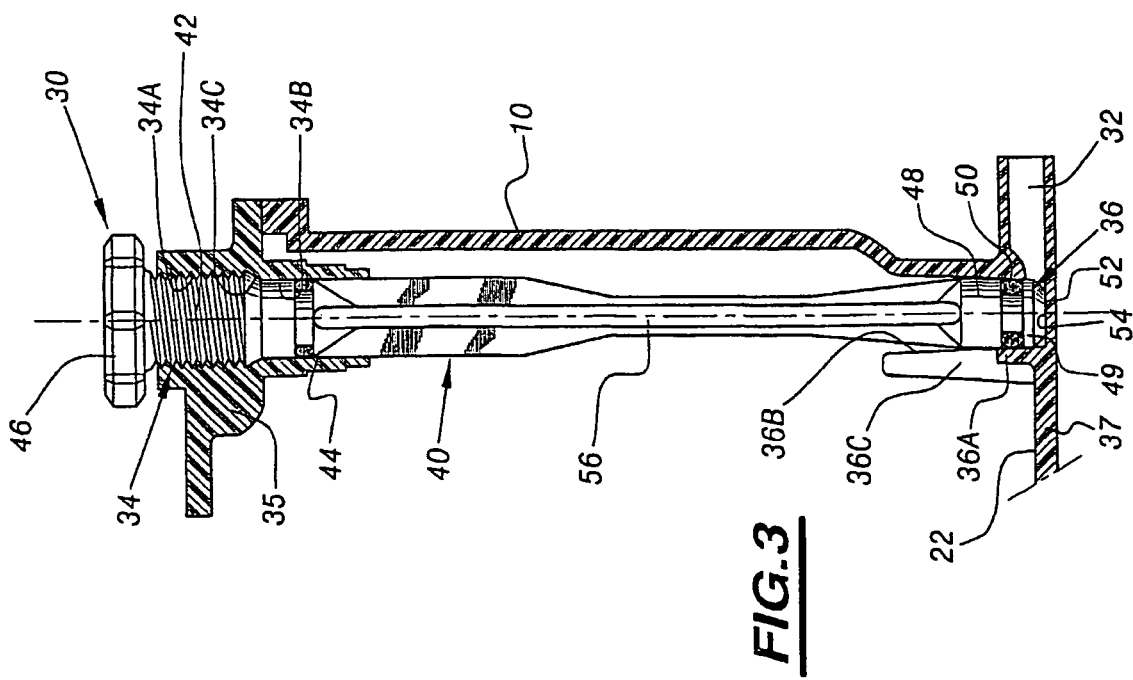

More precisely, and as shown in detail in FIGS. 3 and 4, the purge assembly 30 includes a first orifice 34 for connection to the open air formed in the upper wall 35 of the casing 10. This orifice is of generally cylindrical form with a substantially vertical axis. It is defined by a threaded upper part 34A, a substantially smooth lower part 34B and an intermediate shoulder 34C, the diameter of the lower part being slightly smaller than that of the upper part.

The purge assembly 30 includes a second orifice 36 formed in the lower wall 37 of the casing 10, substantially on the perpendicular to the upstream end of the outflow pipe 32. This orifice 36 is positioned substantially opposite the first orifice 34, or even, as shown in the figures, coaxially. The orifice 36 is defined [by] a substantially cylindrical and smooth lower part 36A, of smaller diameter than that of the lower part 34B of the first orifice 34, and an upper part 36B substantially in the form of a truncated cone, the diameter decreasing downwardly, in which is formed at least one notch 36C to allow connection of the orifice 34 to the bowl 26 at the lowest possible level.

The purge assembly 30 also includes a rod 40 forming an obturator of the orifices 34 and 36. The rod 40 is displaceable with a substantially vertical movement of translation between a low position in which it seals the casing 10, as shown in FIG. 3, and a high position it allows gravity purging of the bowl 22, as shown in FIG. 4.

The rod 40 includes an upper part 42, partially threaded so as to co-operate with the threaded part 34A of the orifice 34. It includes, also in its upper part, an annular groove provided with an O-ring 44 suitable to be pressed against the cylindrical surface 34B of the orifice 34 when the rod 40 is in the sealing position, and to be positioned without being pressed at the level of the shoulder 34C of the orifice 34 when the rod is in the purge position.

The rod 40 also includes at its upper end a head 46 facilitating its handling during screwing-unscrewing manoeuvres. This head 46 is advantageously so arranged relative to the casing as to be able to be easily manoeuvred, in particular taking into account the size of the zone in which the line 1 of FIG. 1 is arranged.

The rod 40 includes a lower end part 48 of generally cylindrical form and terminated by a bevel 49, substantially in the form of a truncated cone, the lateral surfaces of which are for example substantially complementary to the surface of the part 36B substantially in the form of a truncated cone of the orifice 36 of the casing 10. The part 48 of the rod also includes an annular groove provided with an O-ring 50 of smaller diameter than the O-ring 44. This O-ring 50 is suitable to be pressed against the cylindrical surface 36A of the orifice 36 when the rod is in the purge position. The lower part 48 of the rod 40 thus forms a tight plug for the orifice 36 when the rod is in the sealing position and allows evacuation of the water into the pipe 32 through the orifice 36, in the direction of the solid arrow shown in FIG. 4, when it is in the purge position.

The rod 40 also includes a substantially flat lower end face 52 suitable to bear firmly on a wall part 54 rigidly attached to the casing 10 and arranged at the upstream end of the pipe 32.

In addition, the rod 40 includes a standard part 56 in the form of a solid cross-piece of smaller cross-section than that of the remainder of the rod. This structure is sufficiently transversally flexible to take up possible play due to faulty alignment of the respective axes of the orifices 34 and 36. Such take-up can also be envisaged by means of a flexible material forming the standard part 56.

The operation of the filtration device in accordance with the invention is as follows.

In service, that is to say when the device 6, by means of its filtration unit 7, is filtering water from the gas-oil circulating in the low pressure line 1 of FIG. 1, the water is collected in the bowl 22. The rod 40 is occupying the position of FIG. 3 and provides proper sealing of the casing at the level of the orifices 34 and 36 by means of the sealing rings 44 and 50, pressed against their respective sealing surfaces 34B and 36A.

At the purge operation of the device 6, the rod 40 is unscrewed by a sufficient number of turns, for example three, by means of its head 46, so that, overall, it is displaced with a movement of upward translation to attain its purge position of FIG. 4. In this position, the upper O-ring 44 is no longer pressed against a sealing surface with the result that the air can freely enter the inside of the casing 10 through the orifice 34. Similarly, the lower part 48 of the rod frees the lower orifice 36 through which the water is freely evacuated into the pipe 32, under the influence of gravity.

Once the purge is complete, the rod 40 is screwed back into its sealing position. Its lower part 48 is then guided in translation by the part 36B in the form of a truncated cone of the orifice 36, while its upper part 42 positions the O-ring 44 in tight contact with the part 34B of the orifice 34. Continuing the screwing back of the rod 40, the lower O-ring is then positioned in tight contact against the surface 36A of the orifice 36 and the lower end section 52 of the rod abuts firmly against the wall part 54.

Thus, the filtration device in accordance with the invention allows the gravity purge of the filter casing to be performed easily and quickly. In fact the purge operation only requires the manipulation a single plug, instead of two for the relevant devices of the prior art.

In addition, the purge assembly of the device in accordance with the invention does not require sealing pieces attached at the end of the purge operation, such as a washer, as the O-rings 44 and 50 are permanently arranged on the obturator 40.

Moreover, a same rod 40 can be used with a plurality of successive cases 10, in particular when these are changed for reasons of saturation or wear of the filtration means 12. In fact, by completely unscrewing the threaded section 42 from the associated tapped part 34A of the orifice 34, the complete rod 40 can be withdrawn from the casing, the diameters of its lower part and of the O-ring 50 being smaller than that of the cylindrical part 34B of the orifice 34. The rod 40 is then introduced into a new filter casing, its lower part being guided during its introduction by co-operation of its lower end bevel 49 with the part 36B in the form of a truncated cone of the orifice 36.

In addition, it is unnecessary to manufacture the casing 10 with stringent geometrical tolerances, a certain straying of the geometrical characteristics of the casing being absorbed by the purge assembly 30. On the one hand, possible transversal differences linked to the orifices 34 and 36 formed in the casing, for example due to faulty alignment of the axes of these orifices, are taken up both by the flexible standard part 56 of the rod 40 and by the firm contact of the end section 52 on the wall part of the casing 54. On the other hand, possible vertical differences between the upper 35 and lower 37 walls of the casing are rendered acceptable by sufficient over-dimensioning of the length of each of the sealing surfaces 34B and 36A.

Various arrangements of the purge assembly can be envisaged without departing from the scope of the invention. Thus, by way of a modification, the displacement of the rod 40 from its sealing position to its purge position can be effected by other types of connection than that of a threaded connection. Similarly, the manoeuvring head 46 of the rod 40 is not necessarily arranged at its upper end, but can be so at its lower end.

FIGS. 5 to 10 show a device 106 for filtration of gas-oil in accordance with the invention, a modification of the one shown in FIGS. 1 to 4. This device 106 is essentially distinguished from that of FIGS. 1 to 4 by the fact that it includes, in addition to a filtration unit 114 having a function substantially similar to the unit 7 of FIGS. 1 to 4, a unit 110 for electrical heating of the gas-oil to be filtered, tinted grey relative to the heating unit 114 of FIG. 5, and suitable to fluidise the gas-oil when it is used cold.

The filtration unit 114 is provided with a purge assembly 30 in accordance with the invention, similar to that of FIGS. 2 to 4. This purge assembly is indicated in FIGS. 5 to 7 by the same references as those of FIGS. 2 to 4, and will not therefore be described in detail again with reference to these figures.

Figure 5:
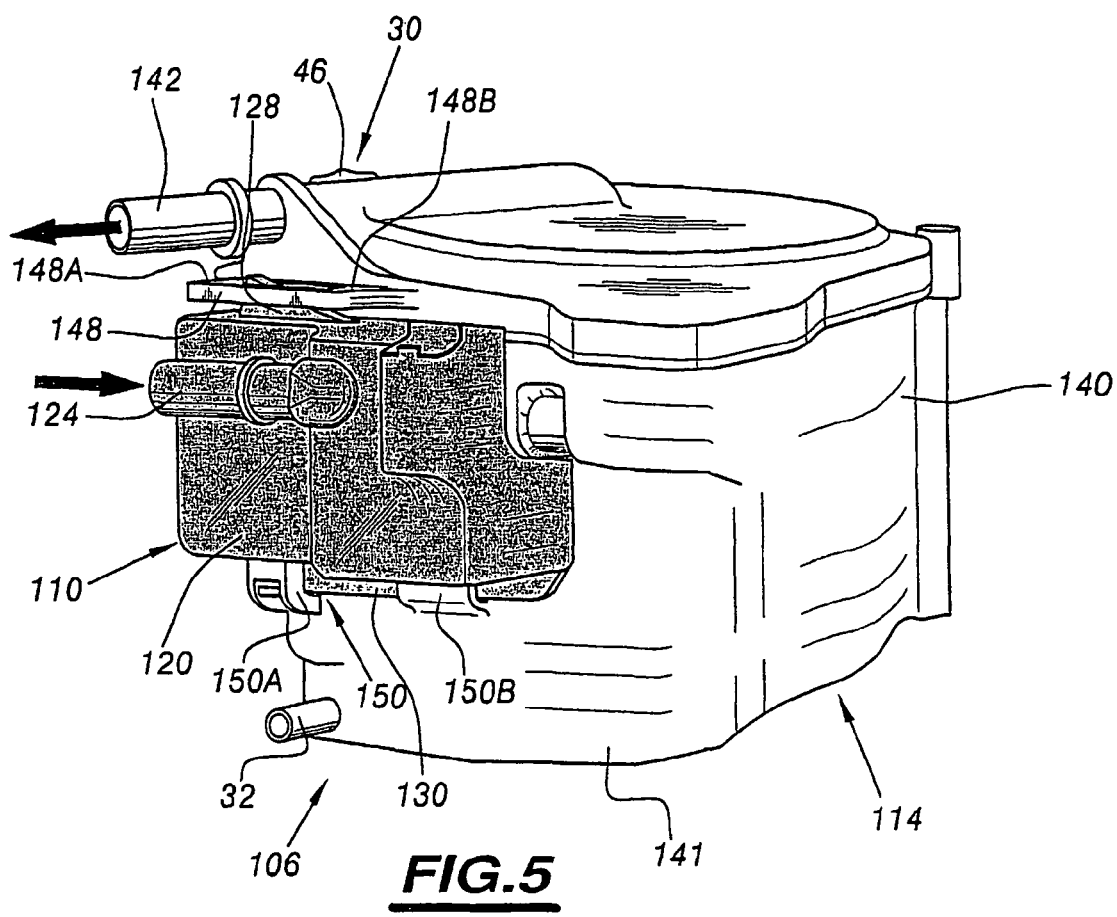
FIG. 5 is a perspective view of an alternative embodiment of the gas-oil filtration device in accordance with the invention.

As indicated by the arrows of FIG. 5, the heating unit 110 is arranged upstream, in the direction of displacement of the gas-oil in the device, of the filtration unit 114, so that the device 106 is suitable to be arranged in a gas-oil supply line of a diesel engine, for example downstream of a tank and upstream of a gas-oil pump supplying this engine.

Figure 6:
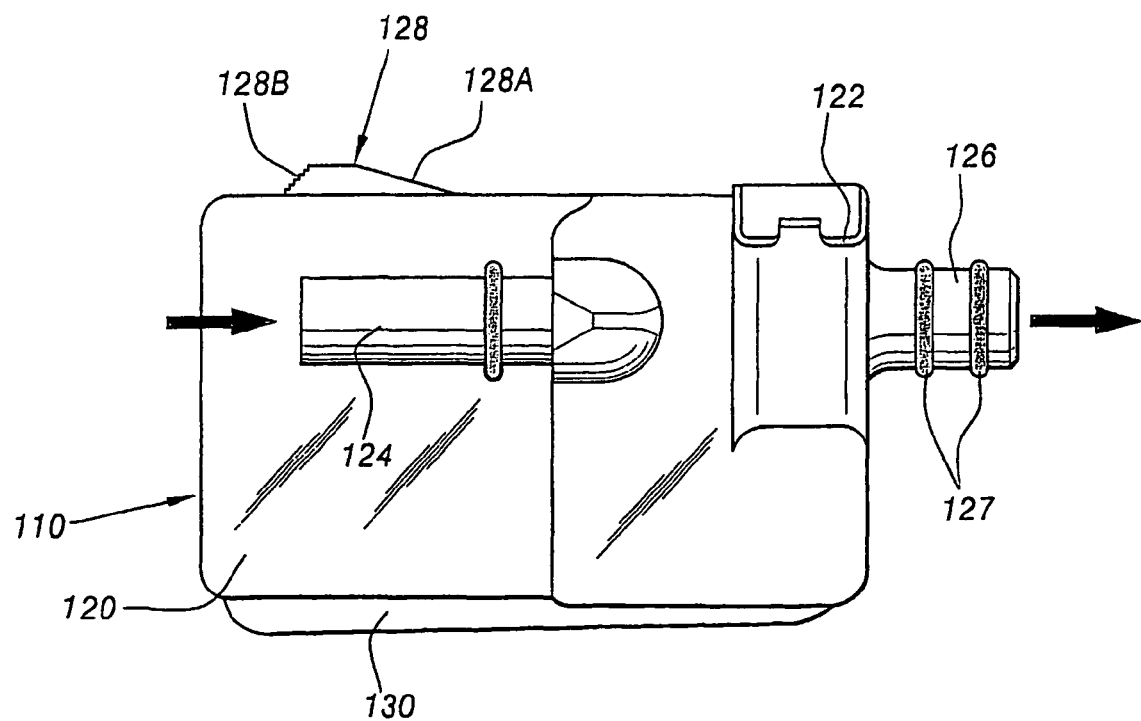
FIG. 6 is a frontal view of the heating unit of the device of FIG. 5.
Figure 7:
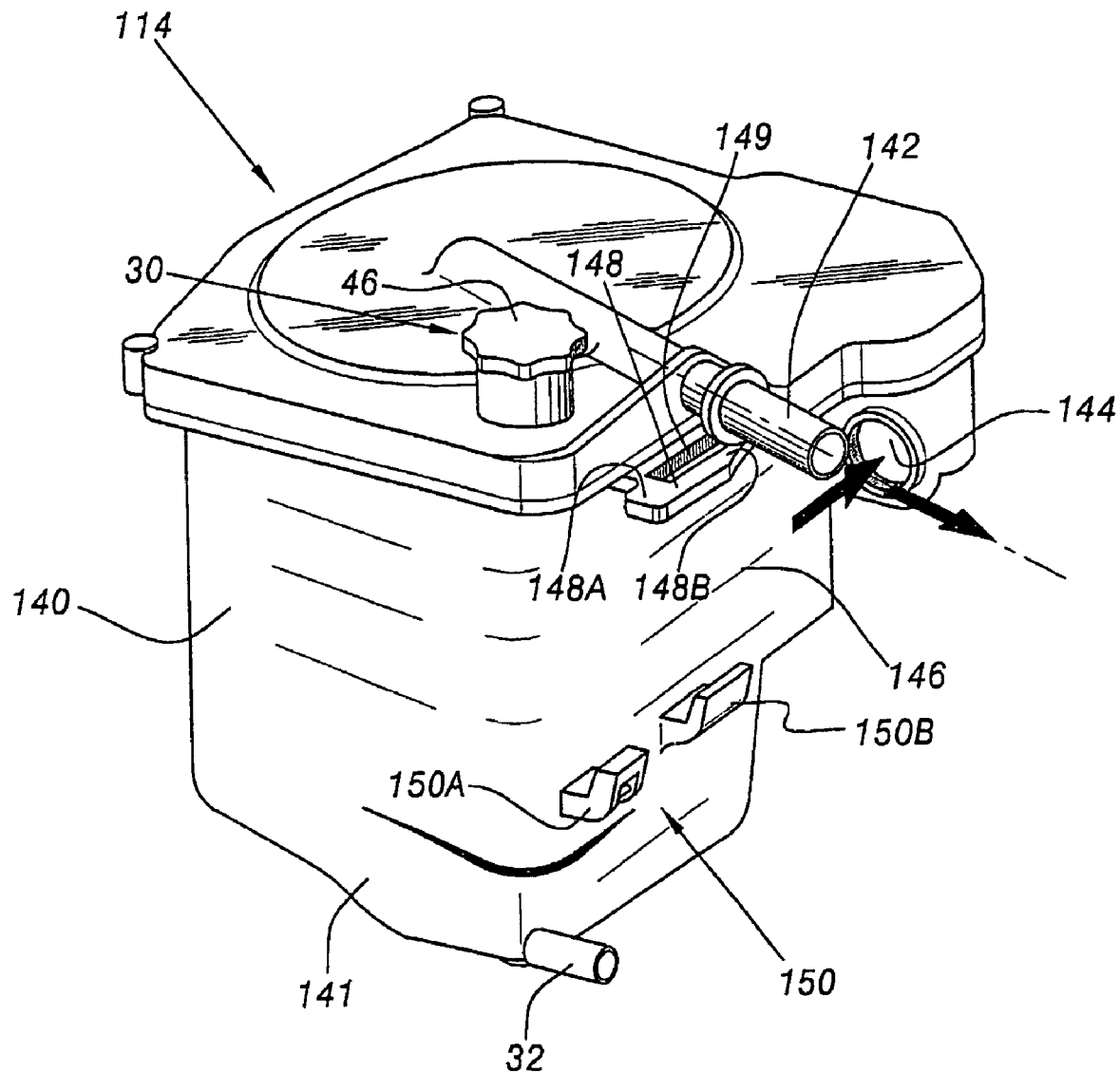
FIG. 7 is a perspective view, at the same angle as that of FIG. 2, of the filtration unit of the device of FIG. 5.

As shown in more detail in FIG. 6, the heating unit 110 includes a casing 120 of substantially parallelepipedal general shape and defining internally a chamber, not shown in the figures, for heating the gas-oil. For this purpose, the unit 110 includes internally one of more electrical heating elements. These elements, themselves known, are arranged in the heating chamber and electrically connected to an electrical connector 122. This connecter is arranged on the casing 120 and intended to receive an electrical power supply cable, for example connected to a battery of accumulators.

The unit 110 externally includes a coupling sleeve 124 for input of the gas-oil to be heated into the heating chamber and a coupling sleeve 126 for outlet of the heated gas-oil, on which are arranged two O-ring seals 127. These coupling sleeves extend in the longitudinal direction of the casing 120, the latter being made, for example, of rigid plastics material and the intake 124 and outlet 126 sleeves being moulded in one piece with the casing 120.

In addition, the casing 120 has notable external characteristics, of which account will be given hereinafter. Firstly, it includes a substantially flat longitudinal face; in the example shown, this is the face not visible in FIG. 6, opposite to the longitudinal face on which the intake sleeve 124 is arranged. In addition, its upper face includes, in its part most distant from the outlet sleeve 126, a protuberance 128. This protuberance includes, on the side of the outlet sleeve 126, a gentle slope 128A and, on the opposite side, a slope with notches 128B. In addition, the lower face of the casing 120 includes a longitudinal rail 130 of continuously decreasing thickness as it approaches the side of the outlet sleeve 126.

FIG. 7 shows in detail the filtration unit 114. This includes a casing 140 of substantially parallelepipedal general shape defining internally a chamber, not shown in the figures, for filtration the gas-oil. For this purpose, the unit 114 includes internally filtration means, such as paper, a Nylon mesh, etc. . . . which are known in themselves. These means permit both retention of the water which the gas-oil contains in emulsion, evacuating it into a collection bowl 141 similar to the bowl 22 described with reference to FIGS. 1 to 4, and retention of solid impurities possibly present in the gas-oil. Once these filtration means are saturated, the whole of the filtration unit 114 should be exchanged with a new unit.

In addition to the purge assembly 30 and corresponding arrangements of its casing 140, the unit 114 includes externally a sleeve 142 for outlet of the purified gas-oil. In addition, a tubular orifice 144 is formed in the wall of the casing 140 so as to receive the outlet sleeve 126 of the heating unit 110.

The casing 140 of the filtration unit 114 is formed of a plastics material substantially similar to that of the casing 120 of the heating unit 110. By complementarity of shape, the casing 140 is able to support and hold in place, detachably, the casing 120. For this purpose, the casing 140 presents externally a substantially flat surface 146 of dimensions substantially complementary to those of the above-mentioned flat longitudinal face of the casing 120. In addition, the casing 140 includes a tab 148, providing a slot 149 for reception of the protuberance 128 on the casing 120. The tab 148 is connected to the casing by two arms 148A, 148B, of which at least the arm 148A is sectile, for example by means of suitable dimensioning. Moreover, the casing 140 includes a slideway 150 for sliding of the longitudinal rail 130 of the casing 120. In the example shown, the slideway includes two parts 150A and 150B, the part 150A substantially opposite the arm 148A being of stronger structure than the second part 150B.

Assembly of the casing 120 of the heating unit 110 with the casing 140 of the filtration unit 114 is effected in the following manner:

The heating unit 110 is firstly so positioned relative to the filtration unit 114 that the surface 146 of the casing 140 is substantially flush with the above-mentioned flat longitudinal face of the casing 120. Then, by a movement of translation of the heating unit 110 relative to the filtration unit 114, the longitudinal rail 130 of the casing 120, guided by the slideway 150 of the casing 140, causes the outlet sleeve 126 of the casing 120 to enter the tubular orifice 144 of the casing 140. This movement of translation is continued until the protuberance 128, which has previously lifted the tab 148 both by means of its gentle slope 128A and under the influence of raising of the casing 120 relative to the casing 140 caused by the increasing thickness of the rail 130, is housed inside the slot 149.

The rear arm 148A, relative to the direction of the preceding movement of translation, of the tab 148 is thus engaged with a notch of the notched slope 128B of the protuberance 128, then preventing the unit 10 from disengaging from the unit 114. The protuberance 128 thus forms a wedge for retaining the heating unit 110 in translation.

The heating 110 and filtration 114 units thus co-operate by complementarity of shape of their respective casings 120 and 140, so that the sleeve 126 and the orifice 144 form direct and sealed means for connecting the heating and filtration chambers.

Once the filtration device 106 is assembled as described above, its operation is as follows.

When the gas-oil is drawn into the low pressure line in which the device 106 is arranged, the gas-oil enters the heating unit 110 where it is, if necessary, heated by the above-mentioned electric heating element or elements. The gas-oil leaves the heating chamber of the unit 110 following the connecting sleeve 126 between the units 110 and 114, and thus arrives directly in the filtration chamber of the unit 114. It leaves it again through the outlet sleeve 142 and follows the evacuation pipe 116, for example to a pump and a diesel engine. The filtration device 106 is thus easy to install since, once the units 110 and 114 are fixed one to the other, it is connected to the line like a standard single filtration element. Fixing of the heating unit to the filtration unit is, for its part, accomplished by a single movement of translation of the one relative to the other. The O-rings 127 provide good tightness of the connection between the two units, even in the presence of vibrations and/or slight axial misalignment between the sleeve 126 and the reception orifice 144.

To the extent that the sleeve 126 and the orifice 144 connect the heating and filtration chambers directly, the heated gas-oil suffers substantially no heat loss during its transfer from the heating chamber to the filtration chamber, moreover increasing the filtering performance of the unit 114.

When it is necessary to purge the water retained in the collection bowl 141, the operation of the purge assembly 30 is similar to that described above with reference to FIGS. 2 to 4.

In addition, when the filtration unit is saturated and ready to be discarded to be replaced by a new filtration unit, it is only necessary to cut the arm 148A of the tab 148. Breakage of the tab at the level of its sectile part 148A releases the wedge 128 and allows the heating unit 110 to be disengaged by a movement of translation in the opposite direction to that required to fix the heating unit onto the filtration one. The heating unit 110 is provided to have a longer life than that of the filtration unit 114, so it can be reused with several successive filtration units. These maintenance operations also have the advantage of being clean, since none of the casings of the assemblies has to be opened. In addition, a filtration unit with a broken tab bears an obvious visual mark that it has already been used and can no longer hold a heating unit in place.

Figure 8:
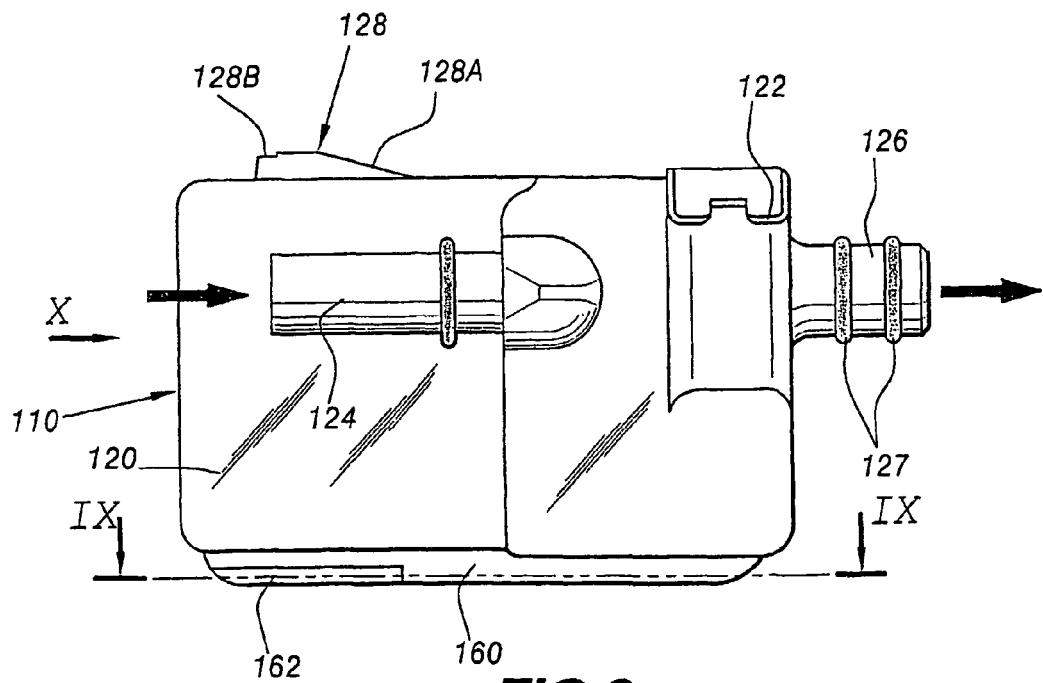
FIG. 8 is a view similar to that of FIG. 6 of an alternative embodiment of the heating unit in accordance with the invention.
Figure 9:
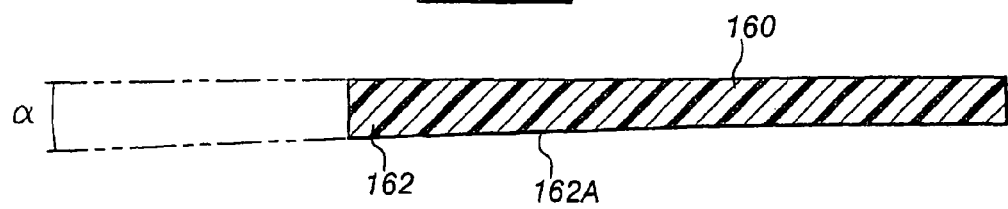
FIG. 9 is a view in section through the plane IX-IX indicated in FIG. 8.
Figure 10:
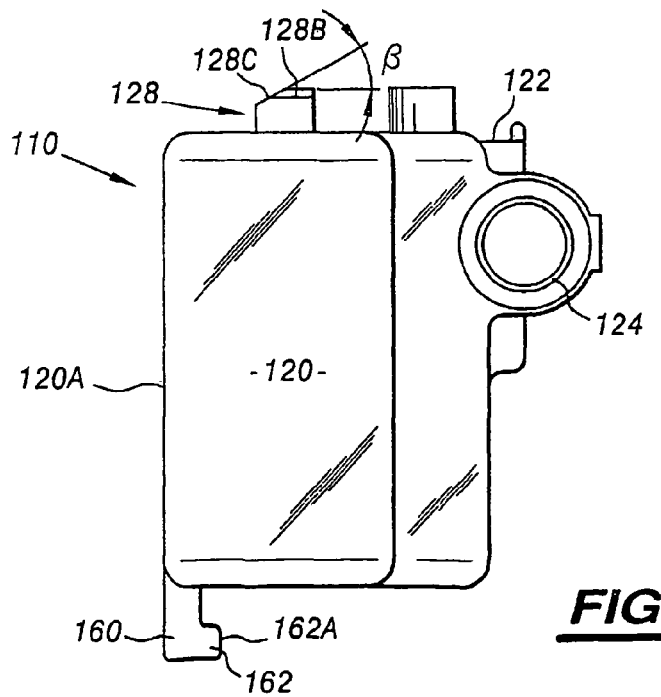
FIG. 10 is a view in the direction of the arrow X indicated in FIG. 8.

FIGS. 8 to 10 show a modified embodiment of the unit 110 for heating gas-oil of the filtration device 106 in accordance with the invention. The unit 110 of FIGS. 8 to 10 is only distinguished from that of FIGS. 5 and 6 by the following.

In addition to the above-mentioned flat longitudinal face, visible in FIG. 10 and referenced 120A, the casing 120 of this heating unit 110 includes a lower longitudinal rail 160 suitable to slide, in the same manner as the rail 130 of FIGS. 5 and 6, in the slideway 150 of the casing 140 of the filtration unit 114. Differently from the above-mentioned rail 130, the rail 160 is of substantially constant thickness and includes a protuberance 162 formed on the part of the rail most distant from the sleeve 126. This protuberance is advantageously made in one piece with the rest of the rail 160. The face 162A, directed oppositely to the face 120A, of the protuberance 162 forms an angle, marked α, relative to the longitudinal direction of the rail 160, as shown in FIG. 9. This angle α is for example of the order of a few degrees.

In addition, the protuberance 128 of this modified embodiment of the heating unit includes one single notch 128B. The face 128C of the protuberance, intended to be turned towards the filtration unit 114, forms an angle of less than 90° with the substantially flat upper face of the protuberance 128. This angle is marked β in FIG. 10 and is advantageously 30°.

Assembly of the casing 120 of the heating unit 110, which has just been described, on the casing 140 of the filtration unit 114 is performed substantially as described with regard to FIGS. 5 to 7.

On the movement of translation of the heating unit 110 relative to the filtration unit 114, the lower rail 160 of the casing 120 is guided by the slideway 150 of the casing 140. Progressively as the protuberance 162, thus forming a ramp, is introduced into the strengthened part 150A of the slideway 150, this protuberance 162 causes the casing 120 to be offset transversally towards the casing 140.

Substantially concomitantly, the gentle slope 128A of the protuberance 128 lifts the tab 148 until the protuberance 128 is housed inside the slot 148 defining the edge of the slot 149 comes into abutment against the inclined face 128C of the protuberance 128, then forming a ramp able to transversally offset the casing 120, moving it away from the casing 140.

The transversal position of the casing 120 is fixed by combination of the above-mentioned movements of transversal shift both of the lower part of the casing 120 of the casing 140 and of the upper part of the casing 120 in the opposite direction.

Once the heating 110 and filtration 114 units are assembled, the casing 120 is on the one hand retained in translation relative to the casing 140, as for the embodiment of FIGS. 5 to 7, and on the other retained transversally to the direction of translation relative to the casing 140.

The filtration device described with reference to FIGS. 8 to 10 has the advantage of being more robust, its fixing means having better mechanical resistance to vibration.

Various alternative embodiments of this modified embodiment of the filtration device in accordance with the invention can be envisaged to the extent that, although using totally distinct casings, i.e. not having a common wall, but of substantially complementary shapes, the heating unit and the filtration unit are connected directly and in tight manner to each other, for example by a short sleeve rigidly attached to one of the two units and essentially housed in the internal chamber of the other of these assemblies.

Also, various forms of casings are possible, in order to functionally obtain an integrated filtration device, the respective casings of the heating and filtration assemblies of which co-operate by complementarity of shape, as described with reference to FIGS. 5 to 10.

Similarly, the means for fixing the heating unit onto the filtration unit are transposable, without departing from the scope of the invention, into means for fixing the filtration unit onto the heating unit. For example, the slide rail can be arranged on the casing of the filtration unit and the associated slideway is then arranged on the casing of the heating unit.

The invention claimed is:

1. A filtration device with improved purge assembly, of the type including a filtration unit, the device comprising:
    a sealed casing internally defining a filtration chamber provided with filtration means and, in its lower part, a bowl for collection of a residual liquid from the filtration means, and
    an assembly for purging the residual liquid which comprises means for evacuation of the liquid collected in the bowl and means for connection of the casing to the open air,
    wherein the means for evacuation of the liquid comprise an orifice formed in the wall of the casing substantially at the level of the bottom of the bowl for collection of the liquid,
    wherein the means for connection to the open air comprises an orifice formed in the wall of the casing substantially opposite the orifice for evacuation of the liquid, and
    wherein the means for connection to the open air and the means for evacuation of the liquid comprise:
        a single obturator displaceable between a sealing position in which, on the one hand, its upper part forms a tight plug for the orifice for connection to the open air and, on the other hand, its lower part forms a tight plug for the orifice for evacuation of the liquid, and a gravity purge position, in which, on the one hand, its upper part is disengaged from the orifice for connection to the open air and, on the other hand, its lower part is disengaged from the orifice for evacuation of the liquid allowing the liquid to be evacuated under the influence of gravity.

2. A device as described in claim 1, wherein the orifice for connection to the open air is defined by a substantially cylindrical sealing surface, and the upper part of the obturator includes an O-ring seal co-operating with the said sealing surface when the obturator is in the sealing position.

3. A device as described in claim 1, wherein the orifice for evacuation of the liquid is defined by a substantially cylindrical sealing surface, and the lower part of the obturator includes an O-ring seal co-operating with the said sealing surface when the obturator is in the sealing position.

4. A device as described in claim 2, wherein the sealing surface of the orifice for entry of air is more extended longitudinally than that of the orifice for evacuation of the liquid.

5. A device as described in claim 1, wherein the orifice for connection to the open air is threaded, and the upper part of the obturator is threaded to co-operate with the orifice for connection with the open air when the obturator is in the sealing position.

6. A device as described in claim 5, wherein the obturator includes, at one of its ends, a head for screwing-unscrewing the obturator.

7. A device as described in claim 6, wherein the obturator comprises, at its end opposite that including said head, a substantially flat surface for abutment against a complementary surface of the casing.

8. A device as described in claim 1, wherein the obturator is in the form of a rod comprising a standard part in the form of a solid cross-piece of smaller cross-section than that of the remainder of the rod.

9. A device as described in claim 1, wherein the obturator is in the form of a rod comprising a standard part, and the standard part is formed of a flexible material.

10. A device as described in claim 1, wherein the obturator is in the form of a rod comprising a standard part, and the standard part comprises a plurality of components assembled to form a structure of flexible dimension.

11. A device as described in claim 1, wherein the means for evacuation of the liquid comprise an outflow pipe for the liquid connected to the orifice for evacuation of the liquid and rigidly attached to the casing.

12. A device as described in claim 1, wherein the filtration unit comprises means for filtering gas-oil, the residual liquid being water.

13. A device as described in claim 12,
wherein the device further comprises an electrical heating unit that comprises:
a casing internally defining a chamber for heating the gas-oil to be filtered, and
means for direct and tight connection of the chambers of the heating and filtration units;
and wherein the device further comprises means for assembly of the casings of the heating and filtration units.

14. A device as described in claim 13, wherein the connection means comprise a sleeve rigidly attached to the casing of one of the heating and filtration units, and an orifice for reception of the said sleeve formed in the wall of the casing of the other of the said units.

15. A device as described in claim 14, wherein the sleeve and the casing to which it is rigidly attached form a single piece.

16. A device as described in claim 14, wherein the connection means comprise sealing means.

17. A device as described in claim 13, wherein the assembly means comprise means for detachably fixing the casing of one of the heating and filtration units to the casing of the other of the units, and wherein the casing at the filtration unit presents externally a surface of dimensions that are substantially complementary to those of a surface presented externally by the casing of the heating unit.

18. A device as described in claim 17, wherein the means for detachably fixing comprise a sliding connection with a slideway between the heating unit and the filtration unit, and means for retaining one of the said units in translation relative to the other.

19. A device as described in claim 18, wherein the connection with a slideway provides an inclined ramp for sliding of one of the said units on the other.

20. A device as described in claim 18, wherein the means for retaining in translation comprise a wedge rigidly attached to the casing of one of the said units, and a tab rigidly attached to the casing of the other of the said units, arranged transversally to the direction of translation and suitable to retain the wedge in translation when the casings of the said units are fixed one to the other.

21. A device as described in claim 20, wherein on the face of the wedge bearing on the tab when the casings of the said units are fixed one to the other, is arranged at least one retaining notch.

22. A device as described in claim 20, wherein the wedge comprises an inclined face for pushing back the tab at the movement of fixing of the heating unit on the filtration unit.

23. A device as described in any claim 20, wherein the tab (148) comprises a sectile part.

24. A device as described in claim 17, wherein the means for detachably fixing comprise means for retention in a direction transversal to the direction of translation of one of the said units relative to the other.

25. A device as described in claim 24, wherein the transversal retention means comprise two ramps for transversely offsetting one of the said units relative to the other, the respective directions of transversal offset of the said two ramps being opposite.

26. A gas-oil supply line, in particular for a diesel engine, of the low pressure type and comprising a tank, a filtration device and a gas-oil pump, wherein the filtration device is contracted in accordance with claim 1.

* * * * *